United States Patent
McNeil

(10) Patent No.: US 6,230,654 B1
(45) Date of Patent: May 15, 2001

(54) SYNTHETIC AQUATIC STRUCTURE, METHOD OF CONTROLLING AN AQUATIC ENVIRONMENT, AND AQUARIUM

(75) Inventor: Roderick J. McNeil, Polson, MT (US)

(73) Assignee: Marine Environmental Solutions L.L.C., Calverton, MD (US)

(*) Notice: Subject to any disclaimer, the term of this patent is extended or adjusted under 35 U.S.C. 154(b) by 0 days.

(21) Appl. No.: 09/134,735

(22) Filed: Aug. 14, 1998

Related U.S. Application Data

(63) Continuation-in-part of application No. 09/041,671, filed on Mar. 13, 1998, now Pat. No. 6,171,686, which is a continuation-in-part of application No. 08/943,335, filed on Oct. 3, 1997, now Pat. No. 6,060,153.

(51) Int. Cl.[7] .................................................. A01K 63/00
(52) U.S. Cl. ............................................................ 119/256
(58) Field of Search .................................. 119/253, 256, 119/268, 245; 47/69, 78, 79, 83; 428/44, 99, 137

(56) References Cited

U.S. PATENT DOCUMENTS

| | | |
|---|---|---|
| 3,299,640 | 1/1967 | Nielsen . |
| 3,540,415 | 11/1970 | Bromley . |
| 3,559,407 | 2/1971 | Schuur . |
| 3,562,952 | * 2/1971 | Bramante ............................ 119/256 |
| 3,590,585 | 7/1971 | De Winter . |
| 3,744,454 | * 7/1973 | Willinger et al. .................... 119/256 |
| 3,820,339 | 6/1974 | Luque . |
| 3,841,266 | 10/1974 | Hoshino . |
| 4,221,078 | * 9/1980 | Latham et al. ....................... 47/41 R |
| 4,221,500 | 9/1980 | Garrett . |
| 4,312,152 | * 1/1982 | Drury et al. .............................. 47/63 |
| 4,337,007 | 6/1982 | Smith . |
| 4,374,629 | 2/1983 | Garrett . |
| 4,437,786 | 3/1984 | Morrisroe . |
| 4,441,453 | 4/1984 | McMickle et al. . |
| 4,478,533 | 10/1984 | Garrett . |
| 4,490,071 | 12/1984 | Morrisroe . |
| 4,534,675 | 8/1985 | Morrisroe . |
| 4,641,997 | 2/1987 | Lauer et al. . |
| 4,657,432 | 4/1987 | Rentrop et al. . |
| 4,699,829 | 10/1987 | Willinger . |

(List continued on next page.)

FOREIGN PATENT DOCUMENTS

| | | |
|---|---|---|
| 1811506 | 7/1969 | (DE) . |
| 1176772 | 4/1968 | (GB) . |
| 1385974 | 3/1975 | (GB) . |
| 54-70989 | 6/1979 | (JP) . |
| 07307326 | 6/1997 | (JP) . |
| WO 85/03539 | 8/1985 | (WO) . |

Primary Examiner—Thomas Price
(74) Attorney, Agent, or Firm—Dickstein Shapiro Morin & Oshinsky LLP

(57) ABSTRACT

A synthetic structure is used to simultaneously provide food, shelter and reproductive support for many aquatic species. Synthetic seagrass may be produced in the form of flexible mats with a plurality of ribbons. The lower ends of the ribbons are anchored to the benthos. The other ends of the ribbons are buoyantly supported in the photic zone. The ribbons may be economically produced in plural coextensive layers, with one layer providing buoyancy and the other layer being structured to enhance biological growth. The system may be tailored for use in desired applications by selecting the surface area structure, ribbon spacing and density, and other parameters. The system may be used to remove nutrients and/or toxic materials from water. The invention may be used to simultaneously promote aerobic and anaerobic reactions to control water quality. The invention also relates to artificial plants, including seagrass mats, for aquariums. The artificial plants may be flexible and buoyant. The artificial plants may promote the growth of fish food in the aquarium, and they may perform other biological functions.

10 Claims, 9 Drawing Sheets

U.S. PATENT DOCUMENTS

| | | |
|---|---|---|
| 4,722,639 | 2/1988 | Alsop . |
| 4,818,579 | 4/1989 | Uchida . |
| 4,950,104 | 8/1990 | Streichenberger . |
| 5,113,792 | 5/1992 | Jones et al. . |
| 5,176,469 | 1/1993 | Alsop . |
| 5,257,596 * | 11/1993 | Jones .................................... 119/256 |
| 5,309,672 | 5/1994 | Spencer et al. . |
| 5,365,884 * | 11/1994 | Jones .................................... 119/256 |
| 5,451,443 * | 9/1995 | Wechsler ................................ 428/99 |
| 5,575,584 | 11/1996 | Alsop . |
| 5,639,657 | 6/1997 | Saiki et al. . |
| 5,669,330 | 9/1997 | O'Hare . |
| 5,871,303 | 2/1999 | Brown, III et al. . |
| 5,876,151 | 3/1999 | Brown, III et al. . |
| 6,004,635 * | 12/1999 | Li ............................................ 428/23 |
| 6,060,153 | 5/2000 | McNeil . |

* cited by examiner

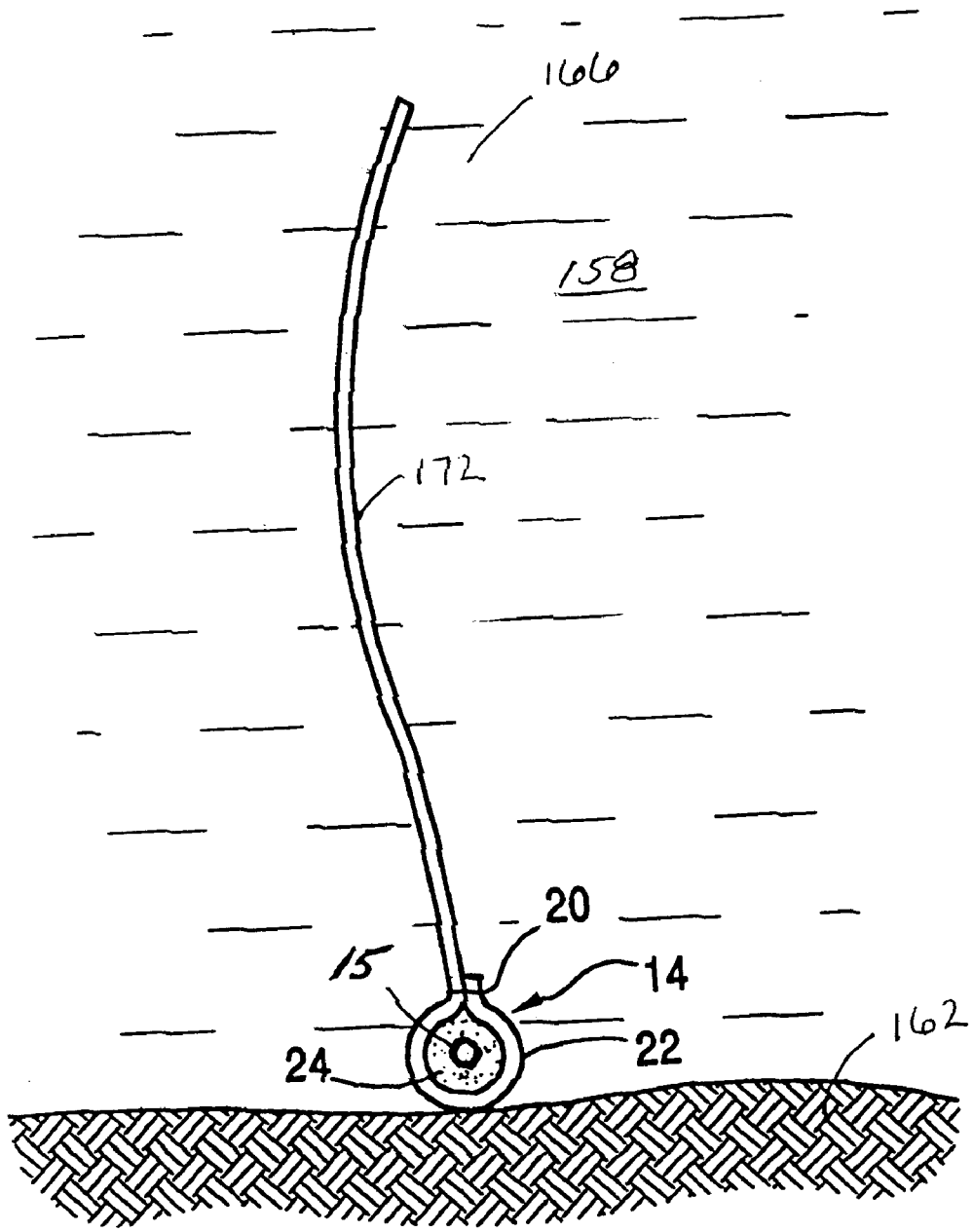

SYNTHETIC AQUATIC STRUCTURE, METHOD OF CONTROLLING AN AQUATIC ENVIRONMENT, AND AQUARIUM

This is a continuation-in-part of U.S. patent application Ser. No. 09/041,671, filed Mar. 13, 1998, now U.S. Pat. No. 6,171,686 which is a continuation-in-part of U.S. patent application Ser. No. 08/943,335, now U.S. Pat. No. 6,060,153 filed Oct. 3, 1997. The entire disclosures of U.S. patent applications Ser. Nos. 09/041,671 and 08/943,335 are incorporated herein by reference.

BACKGROUND OF THE INVENTION

The present invention relates to a system for promoting and/or controlling the growth of biological species. The invention also relates to a buoyant system for providing food, shelter and a nursery environment for biological species.

The invention also relates to a synthetic structure for supporting the growth and reproduction of organisms suitable as food resource material for mollusks, crustaceans, fish, and the like.

The invention also relates to biodegradation and bioaccumulation systems for removing nutrients, heavy metals and other materials from water.

The invention also relates to artificial plants and other structures for providing food, controlling water quality, providing shelter, and/or enhancing aesthetics in an aquarium.

U.S. Pat. No. 5,639,657 (Masamichi) refers to the use of glassy material and other solid materials to form artificial habitats for fish. The structures referred to by Masamichi are intended for use in relatively high energy water where sturdy structures are needed. The structures referred to by Masamichi are static and subject to scour, and fish would have to leave the structures to feed, which would expose the fish to predation.

Other structures that might support or provide a habitat for marine life are referred to in U.S. Pat. No. 4,374,629 (Garrett) and U.S. Pat. No. 3,540,415 (Bromley) and Japanese Patent No. 54-70989.

Prior art synthetic seagrass beds are used in erosion control systems to inhibit the transport of sediment from an area and to simultaneously induce the deposition of sediments to form a berm. The effect of viscous drag may be utilized to maximize the efficiency of the sediment deposition process.

U.S. Pat. Nos. 5,176,469 and 5,575,584 (Alsop) and U.S. Pat. Nos. 4,437,786, 4,490,071 and 4,534,675 (Morrisroe) describe prior art synthetic seagrass beds for providing erosion control.

U.S. Pat. No. 4,699,829 (Willinger) refers to artificial plants for aquariums. The artificial plants are formed of molded plastic. They have a rough matte finish provided by sand blasting the mold or by etching the molded material. The artificial plants are said to have increased surface area to support bacteria growth for biological filtration. The artificial plants are also said to provide secure hiding places for fish.

SUMMARY OF THE INVENTION

The present invention provides a synthetic structure, such as synthetic seagrass, with a high surface area structure. Buoyant material is used to movably support the synthetic seagrass ribbons in the photic zone. The present invention may be used to simultaneously provide food, predation shelter, and breeding enhancement for a wide variety of aquatic species. The invention may also be used as a bioaccumulation or biodegradation system for removing heavy metals, nutrients or other materials from water.

In one aspect of the invention, the high surface area structure is formed of an open cell foam plastic material. Alternatively, the high surface area structure may be formed of a filamentary material, such as polyester batting, dense felt, high loft spun bond material, or needle punch material. The high surface area structure may also be formed within microporous particles.

In another aspect of the invention, the synthetic structure is formed of ribbons each having a buoyant layer and a coextensive second layer. In a preferred embodiment of the invention, the second layers are structurally adapted to enhance biological growth.

An object of the invention is to provide a method of using a synthetic structure to biologically control or improve the quality of an aquatic environment.

Another object of the invention is to encourage and support the production of a natural, regenerative food source for successful aquaculture production in a wide variety of aquatic environments.

Another object of the invention is to provide a durable and economical system for simultaneously providing both food and shelter for aquatic species.

Another object of the invention is to provide a synthetic seagrass system which simultaneously provides a supply of food, shelter and reproductive support for aquatic species in a single structured area. By providing food and shelter in the same structure, a viable population of a given aquatic species may be maintained in a concentrated area.

Another object of the invention is to support the growth of photosynthetic organisms, such as algae, on individual synthetic seagrass ribbons. Such primary production on separate floating ribbons promotes the reproduction and growth of zooplankton, such as daphnia, Cyclops, and paramecium infusora. The zooplankton may be in the range of from twenty microns to six hundred microns in length.

The larger zooplankton are an important food source for many aquatic species. By increasing the population of zooplankton, larger aquatic species are attracted to the synthetic seagrass and supported locally on a permanent basis. Thus, by providing increased biomass production at the base of the food chain, the growth and reproduction potential of all local aquatic life is enhanced.

Simultaneously, the three-dimensional structure produced by the synthetic seagrass provides shelter and habitat for aquatic species. The open surface area of the individual ribbons may be used as an egg laying surface, or as a means of recovering free reproductive stages of such organisms as scallops.

Advantageously, the spacing between ribbons may be selected to control the amount of shade generated within the ribbons, as well as to control predation and cannibalism.

A motion study of cutthroat trout, reared on synthetic seagrass mats with different spacings between mats, revealed that the fish prefer mats that are spaced at intervals slightly shorter than their overall length. Thus, a three-inch fish preferred mats spaced two inches apart while a five-inch fish preferred a four-inch spacing. The young trout spent over 85% of their time inside the mats, grazing on the surfaces of the ribbons and receiving the benefit of continual shelter. As the fish matured, their dependence on the mats decreased until, at six inches, they only entered the mat structure during periods of heavy overcast or at night.

Synthetic mats constructed in accordance with the invention may be used at release points in the wild to provide fish with familiar structure for initial predation protection. After a short period the mats can be retrieved from the release site and used again at different release points.

Another object of the invention is to provide a system that can be economically adapted and tailored for different applications. For example, the growth of organisms on synthetic ribbons may be enhanced by selectively modifying the surface structure and/or by providing desired nutrients in the surface structure. In addition, desired bacteria may be selectively implanted in the high surface area structure to create the desired biological effect in the water.

Another object of the invention is to reduce the reliance on formulated feeds in aquaculture environments. Such formulated feeds may omit important cofactors which are critical to immune function. The present invention may be used to provide a complete, natural diet for aquatic species.

Another object of the invention is to provide an economical and convenient system for removing undesired or excessive nutrients from water. In a preferred embodiment of the invention, both aerobic and facultatively anaerobic reactions are performed simultaneously and in close proximity to one another. The invention may employ high surface area structures such as open cell foam, batting material, felt material, needle-punched material, and other high surface area structures.

Another object of the invention is to provide an economical and convenient system for biologically removing chromium, zinc, and other toxic metals, and for complexing such metals to preclude their future biological availability.

Another object of the invention is to provide buoyant, free moving, artificial plants (and other flexible structures) for aquariums. The invention also relates to artificial plants and other structures for providing a continuous supply of food, controlling water quality, providing shelter, and/or for enhancing aesthetics in aquariums. The invention may be useful in small pet aquariums and in large zoo aquariums. The artificial plants may be from a few centimeters to several meters in length.

Another object of the invention is to provide an economical method of making biologically active artificial plants for aquariums and the like.

Other features, objects and advantages of the invention will become apparent from the following detailed description and drawings illustrating preferred embodiments of the invention.

BRIEF DESCRIPTION OF THE DRAWINGS

FIG. 15 is an end view of an artificial plant located in an aquarium.

DETAILED DESCRIPTION OF PREFERRED EMBODIMENTS

Figure 1:
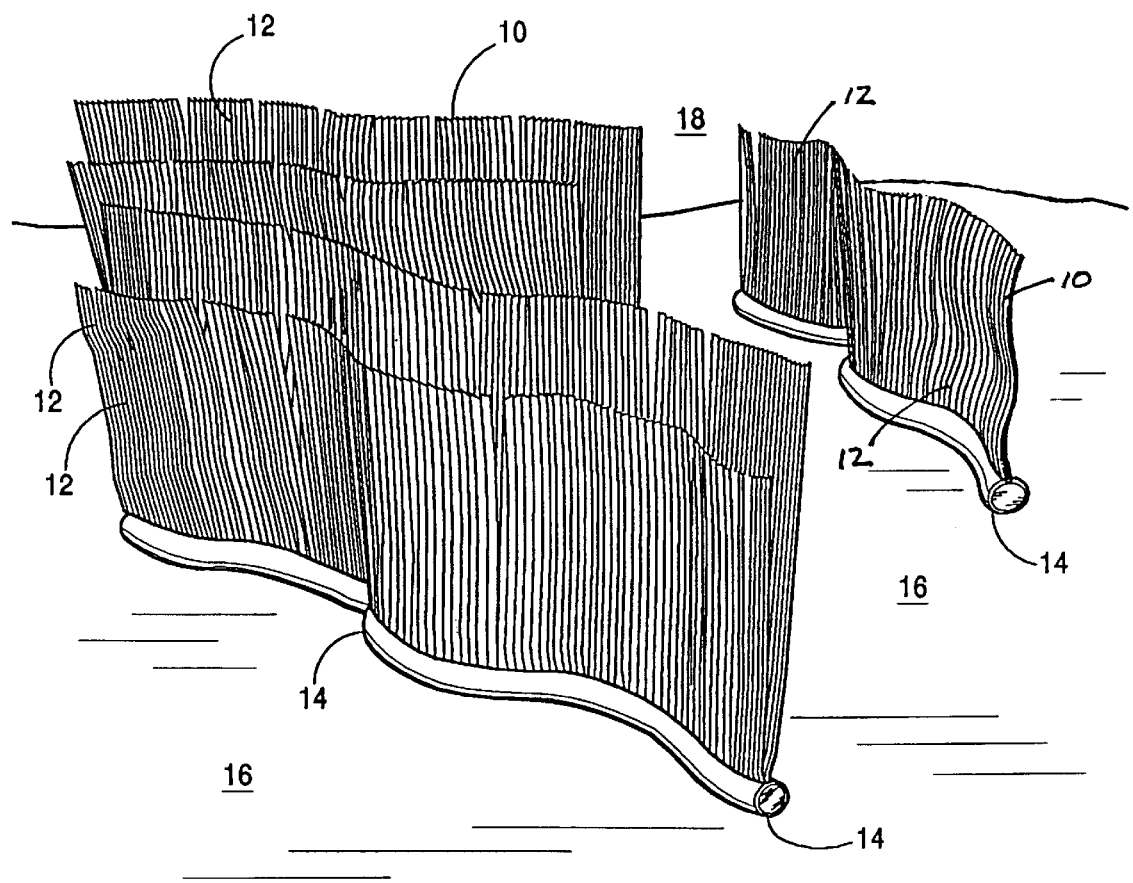
FIG. 1 is a perspective view of synthetic seagrass mats constructed in accordance with the present invention.
Figure 2:
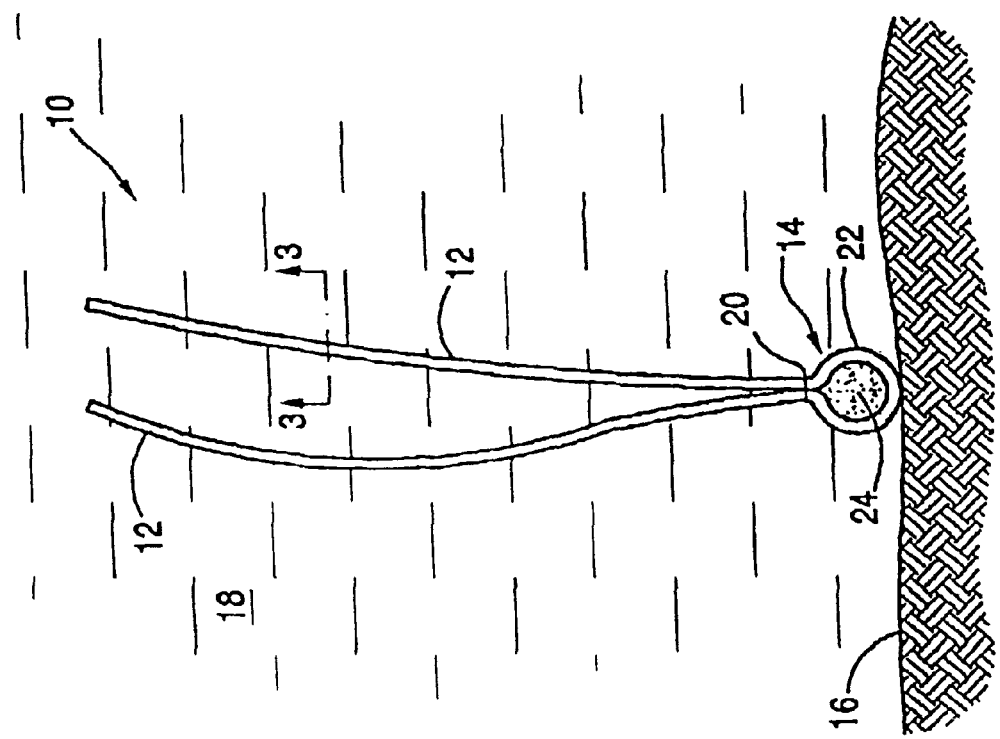
FIG. 2 is an end view of one of the synthetic seagrass mats of FIG. 1.

Referring now to the drawings, where like elements are designated by like reference numerals, there is shown in FIG. 1 a plurality of synthetic seagrass mats 10 constructed in accordance with the present invention. The mats 10 may be employed in seawater, freshwater, and other aquatic systems and environments. Each mat 10 has a plurality of ribbons 12 and a flexible anchor structure 14 for securing the ribbons 12 to the benthos 16 (FIG. 2). The upper ends of the ribbons 12 are buoyantly suspended in the photic zone 18.

In the illustrated embodiment, each mat 10 is constructed of a single sheet of multi-layer material folded over on itself and sewn (stitches 20) to produce a hollow tube 22. The sheet may be folded in the middle to produce a mat with side-by-side sets of ribbons 12. Alternatively, the sheet may be folded at an edge so as to have only one set of ribbons 12. The tube 22 is located at the base of the folded sheet structure. The sheet may be ten meters in length to form a mat 10 that is ten meters long measured along the anchor structure 14. The sheet is slit perpendicular to its length at two and one-half centimeters intervals to produce the individual ribbons 12.

The anchor structure 14 is formed by filling the tube 22 with ballast 24. The ballast 24 may be sand, crushed rock or another available material. The ballast 24 provides sufficient negative buoyancy to sink the mat 10. The integral anchor structure 14 is advantageous in that it requires no penetration into the benthos 16. Another advantage is that the flexible structure 14 allows easy movement of the mat 10 within a pond, tank or runway to the desired spacing for maximizing shelter or removal for cleaning.

The length of the ribbons 12 may be determined according to the depth of the photic zone 18 at the installation location. While the zone 18 might be as deep as thirty meters, a typical ribbon length would be from one to four meters. In the illustrated embodiment, the ribbons 12 are each about 1.3 meters long. Some of the ribbons may be longer than others to control shading and predation. As discussed in more detail below, the mats 10 may be arranged in rows spaced at intervals of from about five to fifteen centimeters.

The width and stiffness of the ribbons 12 affect the mass transfer of nutrients between adjacent ribbons 12. The width and stiffness of the ribbons 12 also affect the ability of the mat 10 to provide shelter for aquatic species. The preferred ratio of height to width for each ribbon 12 is in the range of from 20:1 to 60:1. The width of the ribbons 12 may be from one to five centimeters, preferably about 2.5 centimeters. The stiffness of each ribbon 12 may be from 0.5 to 3.0 grams per centimeter as measured by ASTM D5342. Providing buoyant material along the full length of the ribbon 12 increases the stiffness of the ribbon 12.

In practice, the ribbons 12 move independently of each other in the water in a wavy fashion. This wave motion assists in the mass transfer of nutrients to and from the surfaces of the ribbons 12. While FIG. 2 shows only two ribbons 12 for the sake of clarity of illustration, other ribbons 12 located behind the illustrated ribbons would also be visible in practice.

Figure 3:
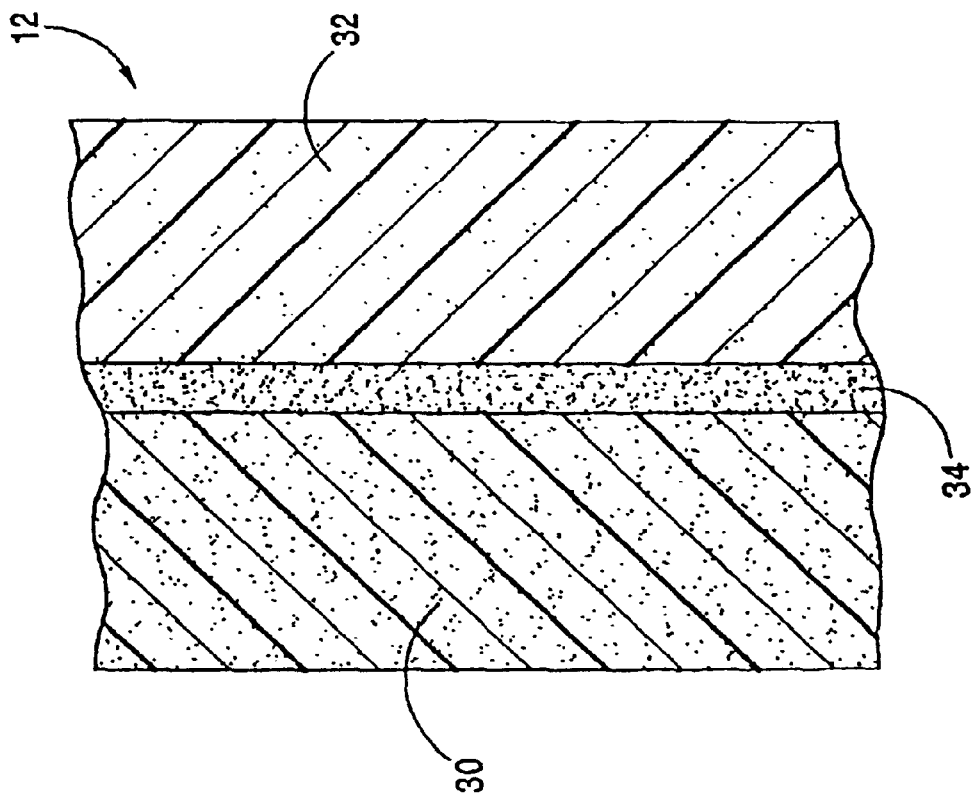
FIG. 3 is a partial cross section view of a single ribbon of the seagrass mat of FIG. 2, taken along the line 3—3.

Referring now to FIG. 3, in the illustrated embodiment, each ribbon 12 has first and second layers 30, 32. The layers 30, 32 are integrally secured together by a suitable extruded adhesive 34. Other adhesive materials or other securing means may be employed instead of the extruded adhesive 34, if desired. The first layer 30 provides buoyancy. The second layer 32 provides a high surface area structure for enhanced aquatic growth. The layers 30, 32 are generally coextensive with the ribbon 12. In other words, each layer 30, 32 extends along and across substantially the full length and width of the ribbon 12.

In the illustrated embodiment, the first layer 30 is formed of a closed cell polyethylene foam about 2.2 millimeters thick.

In alternative embodiments, the closed cell foam of the first layer 30 may be formed of polyurethane, polypropylene or another suitable material. The foam material may have a specific gravity of from 0.05 to 0.6 grams per cubic centimeter, more preferably 0.15 to 0.2 grams per cubic centimeter, even more preferably about 0.19 grams per cubic centimeter. Preferably, the entire composite ribbon structure 30, 32, 34 has a specific gravity in the range from 0.15 to 0.25 grams per cubic centimeter.

The second layer 32 is formed of an open cell polyethylene foam. The open cell foam material has a reticulated open pore surface structure to support and thereby promote biological growth. The open cell material provides anchorage for periphytic organisms. To enhance the growth of algae, the cell size of the open pore structure should preferably be larger than about twenty microns and less than about two thousand microns. In the illustrated embodiment, the second layer 32 has an average pore size of about two hundred microns.

The surface area of the open cell material for the second layer 32 may be at least about 1.9 square meters per gram, preferably greater than 20.0 square meters per gram.

Preferably, the second layer 32 is thin enough to permit mass transfer of nutrients through the surface structure. In the illustrated embodiment, the thickness of the second layer 32 is about 1.0+/−0.2 millimeters.

Preferably, the synthetic structure 30, 32, 34 is formed of materials that can be sterilized by steam or chlorine without being damaged.

Figure 4:
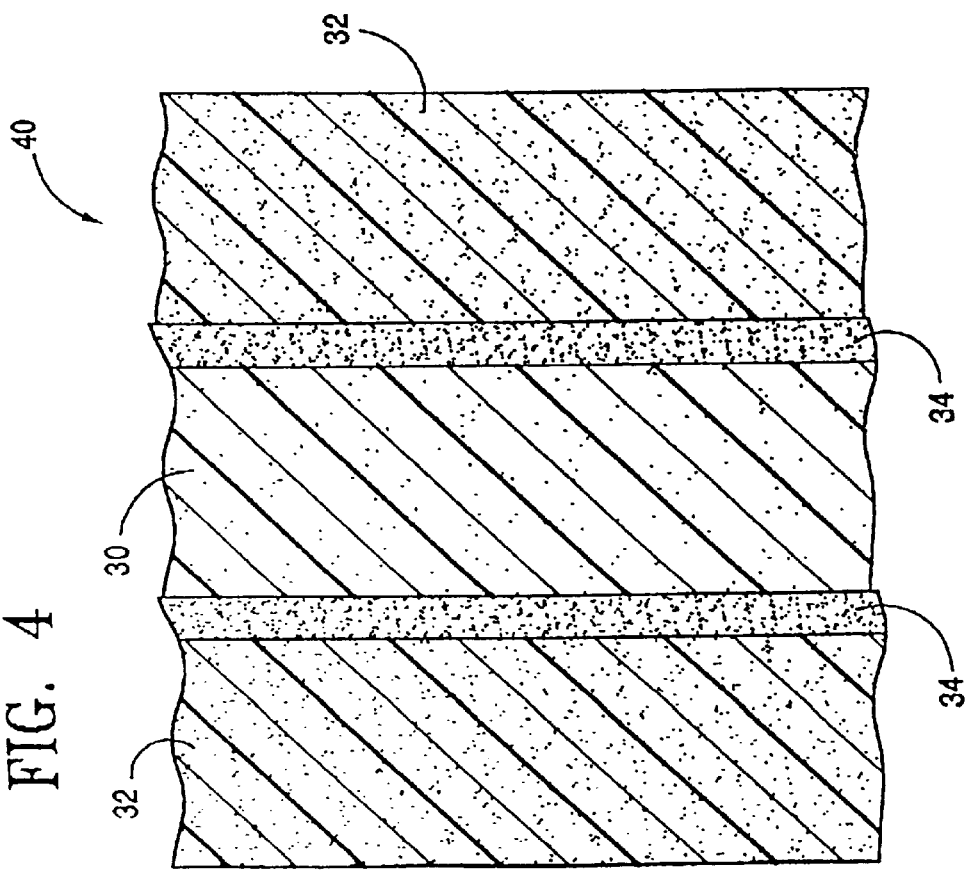
FIG. 4 is a partial cross section view, like FIG. 3, of a ribbon for another synthetic seagrass mat constructed in accordance with the invention.

A ribbon 40 for another synthetic mat is shown in FIG. 4. The ribbon 40 has two second layers 32 sandwiching a buoyant layer 30. The ribbon 40 provides increased surface area for enhanced biological growth. The ribbon 40 may be used in mats like the ones shown in FIGS. 1 and 2.

In general, providing only a single second layer 32 per ribbon, as is the case in the FIG. 3 embodiment, is advantageous to prevent one second layer from shading the other. However, in alternative embodiments of the invention, each ribbon may have three or more layers, all of which may be coextensive with each other.

Figure 5:
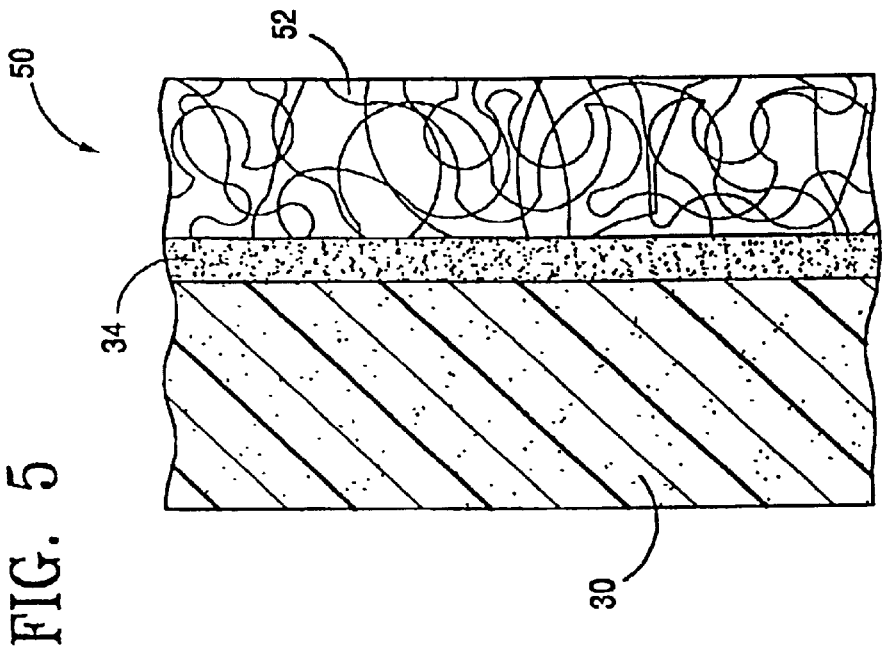
FIG. 5 is a partial cross section view, like FIG. 3, showing a ribbon for another synthetic seagrass mat constructed in accordance with the invention.

A ribbon 50 for another synthetic mat is shown in FIG. 5. The ribbon 50 has a second layer 52 formed of a spun polyester batting. The batting material provides a hold fast surface for enhanced biological growth. Other than the second layer 52, the ribbon 50 shown in FIG. 5 is substantially the same as the ribbon 12 shown in FIGS. 1–3. The ribbon 50 may be used in a seagrass mat like the one shown in FIGS. 1 and 2, in place of or in addition to the open cell ribbon 12. In addition, the polyester batting material 52 may form a sandwich structure on a layer of buoyant material 30, in the manner shown in FIG. 4.

In the embodiment illustrated in FIG. 5, the polyester batting is preferably in the weight range of from fifteen to one hundred grams per square meter, providing a surface area of from one to one hundred square meters per gram, preferably less than fifty square meters per gram. The diameter of the continuous filaments used to produce the complex three dimensional batting structure is from five to fifty microns. In the illustrated embodiment, the batting material is a SYNTECH 250 brand spun polyester batting material produced by Synthetic Industries, Inc., which is a seventy grams per square meter spun polyester fiber batting with a surface area of twenty four square meters per gram.

In an alternative embodiment of the invention, the second layer 52 may be formed of dense felt. In another embodiment of the invention, the second layer 52 may be formed of a high loft, spun bond material. The present invention is not limited to the specific seagrass structures shown and described herein.

Figure 6:
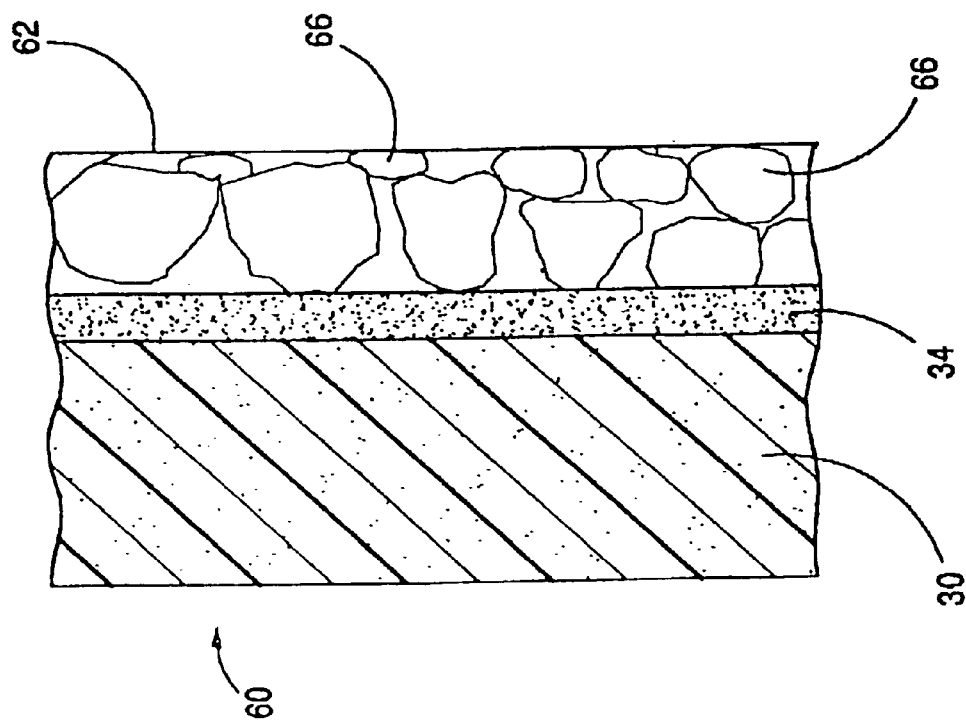
FIG. 6 is a partial cross section view, like FIG. 3, showing a ribbon for yet another synthetic seagrass mat constructed in accordance with the invention.

A ribbon 60 for yet another synthetic seagrass structure is shown in FIG. 6. The ribbon 60 has a second layer 62 with a microporous surface structure. Other than the second layer 62, the ribbon 60 shown in FIG. 6 is essentially the same as the ribbon 12 shown in FIGS. 1–3. The ribbon 60 may be used in mats like the one shown in FIGS. 1 and 2, in place of or in addition to the open cell ribbon 12. Alternatively, the microporous layers 62 may be used in a sandwich structure on both sides of a buoyant material 30 in the manner shown in FIG. 4.

Figure 7:
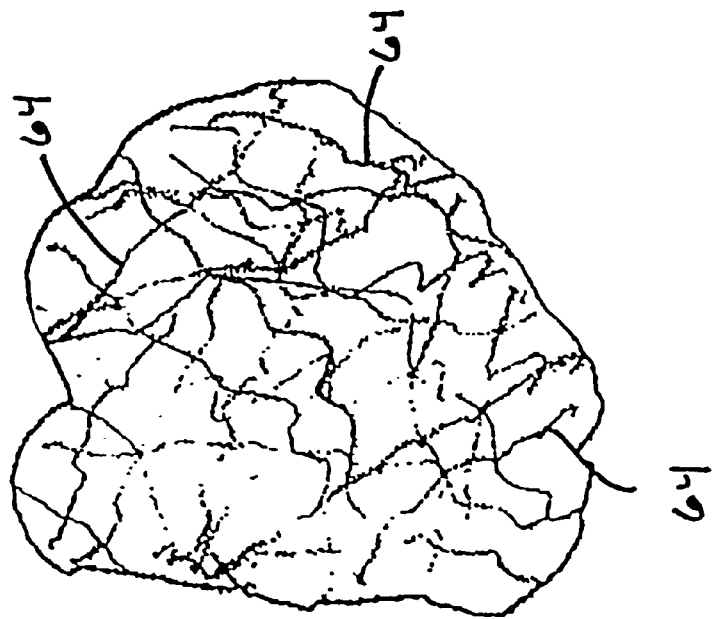
FIG. 7 is an enlarged view of a portion of the ribbon of FIG. 6.

In the embodiment illustrated in FIG. 6, the second layer 62 is preferentially composed of pores 64 (FIG. 7) that are too small to allow the growth of typical periphytic algal species. Accordingly, the predominant growth within the pores of the layer 62 would be limited to picoplankton which is predominantly bacterial in nature.

By embedding appropriate nutrients in the pores 64, the growth of picoplankton can be selectively enhanced for bacteria desired for specific purposes such as cleansing of the environment. Thus, synthetic seagrass mats can be tailored for one or more specific uses by preselecting a desired high surface area structure and/or providing selected nutrients within the pores 64 of the high surface area structure. In an alternative embodiment of the invention, selected bacteria can be implanted in the pores 64 of the high surface area structure with or without implanting nutrients in the porous structure.

In a preferred embodiment of the invention, an array of ribbons 60 each with different, selected nutrients can be used to create an artificial wetland for the removal and complexation of excess nitrate and phosphorous compounds in the water supply.

The very small pores 64 may be produced by the adhesion of multiple layers of granular high surface area particles 66

(FIG. 6) to the closed cell foam material 30. The granular particles 66 may have a surface area of from fifty to six hundred square meters per gram. The size of the particles 66 may be from twenty to two hundred microns. The particles 66 may be formed of carbon, silica, polyurethane, copolymers of styrene divinyl benzene, or other materials. The surface area and pore size of the particles 66 may be controlled by known techniques during the manufacture of the particles 66. The present invention may provide one hundred times or more the available surface area of natural plants while performing many of the other desired functions of plants in aquatic environments, such as providing protection against predation.

Figure 12:
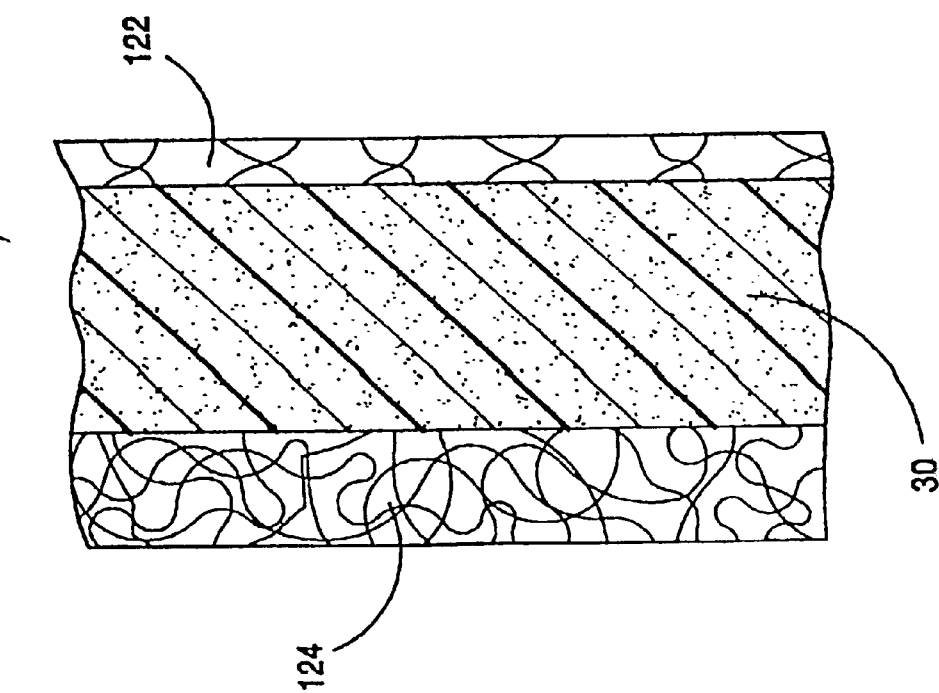
FIG. 12 is a partial cross section view, like FIG. 3, of a ribbon for another synthetic seagrass mat constructed in accordance with the invention.

A ribbon 120 for yet another seagrass structure is shown in FIG. 12. The ribbon 120 has a second layer 122 formed of coarse open cell foam or high loft, spun bond material. The ribbon 120 has a third layer 124 formed of open cell foam or dense felt. A buoyant layer 30, which may be formed of closed cell foam, is sandwiched between the second and third layers 122, 124. The three layers 30, 122, 124 are adhesively laminated to each other. Preferably, the third layer 124 is thicker than the second layer 122.

Preferably, the density of the third layer 124 is at least about 1.5 ounces per square yard. Felt material lighter than about 1.5 ounces per square yard may permit adequate perfusion for oxygen to reach all the way through the third layer 124 to the surface of the buoyant layer 30, even after a biofilm is established, thereby eliminating the potential for facultative anaerobic growth near the surface of the buoyant layer 30.

Figure 13:
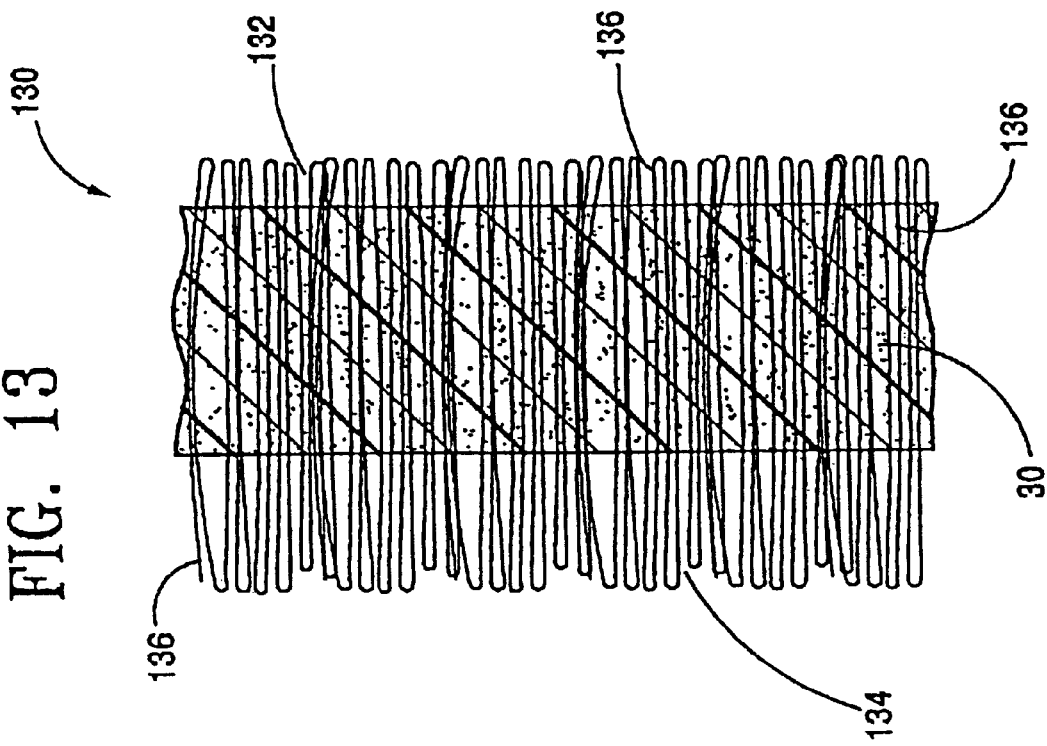
FIG. 13 is a partial cross section view, like FIG. 3, of a ribbon for another synthetic seagrass mat constructed in accordance with the invention.

A ribbon 130 for yet another seagrass structure is shown in FIG. 13. The ribbon 130 has a second layer 132 and a third layer 134. A buoyant, closed cell foam layer 30 is located between the second and third layers 132, 134. The second and third layers 132, 134 are formed by needle punching thread 136 back and forth through the buoyant layer 30. Preferably, the thickness of the third layer 134 is greater than the thickness of the second layer 132. The third layer 134 may be, for example, about 0.040 inches thick. The second layer 132 may be less than about 0.016 inches thick. In addition, the permeability and diffusivity of the second layer 132 are preferably greater than those of the third layer 134. In the illustrated embodiment, the buoyant layer 30 is about 0.095 inches thick. The thread 136 for the second and third layers 132, 134 is about 5 denier and provides an overall density of about 4 ounces per square yard. The distribution of the thread 136 between the second and third layers 132, 134 is about 30% and 70% respectively.

The thickness of the third layer 134 may be about 0.042 inches with a 10 gram per square centimeter load. The thickness of the second layer 132 is preferably about 0.016 inches. The permeability of the third layer 134 may be about 0.23 darcy at the surface of the foam layer 30. The permeability of the second layer 132 at the surface of the foam layer 30 is about 31 darcy. Without limiting the scope of the invention, the total surface area of the seagrass structure 130 may be about 564 square meters per square meter of surface, considering all pores down to 40 angstroms.

While the specific embodiment illustrated in FIG. 13 provides advantageous results, the present invention is not limited to the specific structures described and illustrated in detail herein.

The seagrass structures shown in FIGS. 12 and 13 can be used to promote aerobic and facultatively anaerobic reactions simultaneously in close proximity to one another. In particular, the aerobic reduction of ammonia can take place very rapidly within the second layers 122, 132, near the surface of the buoyant layer 30, provided the structures 120, 130 are located in water with a dissolved oxygen load of 2 to 12 milligrams per liter. The chemistry of the ammonia reduction reaction is as follows:

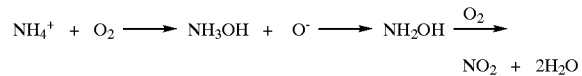

At the same time, the anaerobic reduction of nitrate can occur within the third layers 124, 134 near the surface of the buoyant layer 30. Peroxidase surface analysis has shown that nitrate reduction can be limited exclusively to regions located relatively deep within the thicker third layers 124, 134.

Thus, for example, a layer 134 of needle-punch felt with a density of at least about 1.5 ounces per square yard, and with the establishment of a biofilm and its detrial layer, may be used to prevent dissolved oxygen from reaching the surface of the buoyant layer 30, thereby creating sufficiently anaerobic conditions to support Nitrobacter, the primary genus involved in nitrite/nitrate reduction.

Further, characterization of the density of the third layers 124, 134 by porisimetry shows that the permeability or diffusivity of the layers 124, 134 is another means of describing its limitation to oxygen transport. The size of the pores in the layers 124, 134 and the relative thickness of the layers 124, 134 both affect permeability.

Diffusivities less than $D_{AB}=1\times10^{-6}$ square centimeters per second for water in the third layers 124, 134 at the surface of the buoyant layer 30 generally produce sufficiently low oxygen mass transport rates through the third layers 124, 134 to allow anaerobic conditions to become established. The addition of a bacterial layer of detrius inside the pore structures within the third layers 124, 134 further reduces the permeability and thereby also reduces diffusivity.

The much more open second layers 122, 132 allow mass transfer of oxygen limited only by the concentration gradient of the gas in the water. Oxygen utilization is only used in bacterial aerobic digestion of solutes transported by diffusion in the water, and the rates of diffusivity for gases in fluids are typically an order of magnitude higher than that of inorganic solutes (nitrates and nitrites).

Further, the closely associated periphytic algal layer at the outermost surface of the second layers 122, 132 produces oxygen in the presence of sunlight, thereby increasing the local gradient for oxygen saturation in the vicinity of the second layers 122, 132.

The two diffusivity phenomenon discussed above, controlled by the permeability of the seagrass structures 120, 130, allow anaerobic and aerobic processes to proceed simultaneously only microns apart. Thus, the seagrass structures 120, 130 have dramatically improved performance as biological filters. With the present invention, water contaminated with high levels of nitrates, nitrites, and ammonia can be treated by a single filter type at very high mass transfer rates. Thus, for example, the invention may be particularly useful in the treatment of agricultural runoff in constructed wetlands.

The very short mass transfer distances associated with the use of thin films and the availability of high dissolved oxygen concentrations generated by photosynthesis in the periphytic algal community combine to very rapidly convert soluble inorganic nutrients (nitrates, nitrites and ammonia)

to biological tissue which may be utilized as a food source by aquatic species such as finfish, crustaceans and mollusks. Simultaneously with this periphytic biomass production, reduced toxicity caused by soluble inorganic compounds, particularly ammonia, allows increased stocking densities for many species which are intolerant of ammonia, at even modest levels. Examples of species which specifically benefit by the removal of ammonia are shrimp, bass, trout and salmon.

The materials used in the ribbons 12, 40, 50, 60, 120, 130 should preferably be composed of polymers which do not leach harmful chemicals into the environment. The materials of the ribbons 12, 40, 50, 60, 120, 130 do not decompose in water (including seawater) and sunlight. Consequently, the mats 10 may be used for long periods of time and may be cleaned and reused at other sites. If desired, the ribbons 12, 40, 50, 60, 120, 130 may include one or more additional layers (not illustrated) or materials for reinforcing, preserving or protecting the ribbons 12, 40 50, 60, 120, 130.

Figure 8:
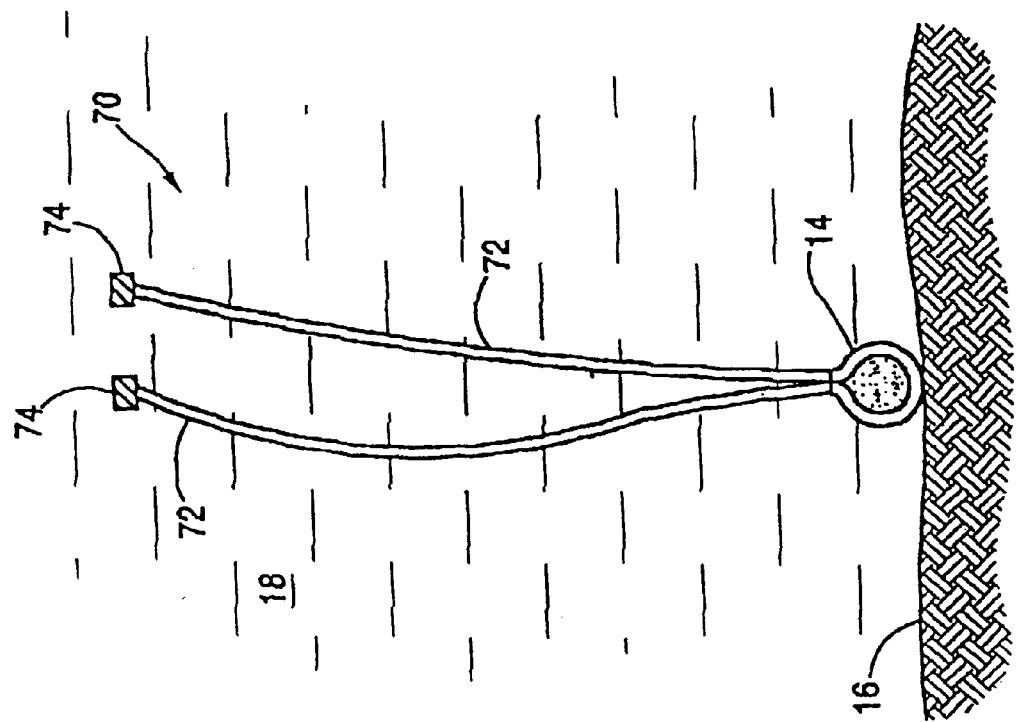
FIG. 8 is an end view, like FIG. 2, showing flotation structures for a seagrass mat constructed in accordance with the invention.

Referring now to FIG. 8, synthetic seagrass mats 70 may have ribbons 72 with buoyant structures 74 secured to their upper ends. The ribbons 72 may be the same as the ribbons 12, 40, 50, 60, 120, 130 described above, in which case the ribbons 72 are buoyant and the buoyant structures 74 provide additional buoyancy. Alternatively, the ribbons 72 may be formed mainly or entirely of one or more of the high surface area structure materials 32, 52, 62, 122, 124, 132, 134 described above, in which case the buoyant structures 74 provide all or most of the buoyancy needed to support the ribbons 72.

The buoyant structures 74 may be formed of open cell polyethylene foam or another suitable buoyant material. The buoyant structures 74 may be adhered, stitched or otherwise appropriately connected to the upper ends of the ribbons 72. The mats 70 may be used to provide biological growth enhancement and aquatic shelter as in the other embodiments described above.

Figure 9:
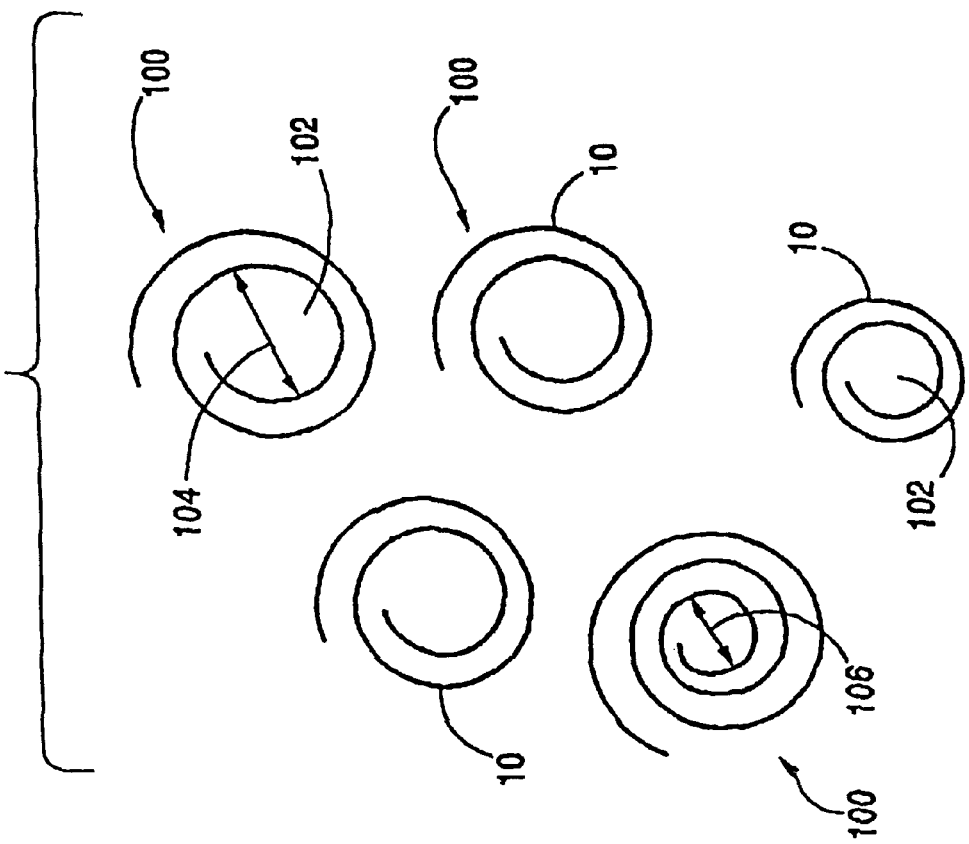
FIG. 9 is a schematic plan view of an aquaculture system constructed in accordance with the present invention.

Referring now to FIG. 9, the synthetic mats 10 shown in FIGS. 1 and 2 may be arranged in spirals or other substantially closed contours to serve as shelters or corrals 100 for scallops, mussels, oysters or other mollusks. The corrals 100 may be especially useful for collecting and feeding spat. By making the spirals more or less tight, a single length mat 10 may be used to make corrals 100 having different internal diameters 104, 106 as desired.

In operation, scallops (not illustrated) may be placed in the center 102 of a corral 100. The spat (larvae) migrate radially outward from the center 102 as they begin to develop shells. The growing spat attach to the individual ribbons 12 of the mat 10. During the growth cycle, the mat 10 attracts and promotes the production of food in the immediate vicinity of the rapidly growing juvenile scallops.

When the spat have settled out, the mat 10 can be partitioned and distributed to maturation sites where a perimeter fence of mats 10 prevents the scallops from escaping. In one embodiment of the invention, the ballast 24 may be emptied out of the flexible anchor means 14 and the anchor means 14 may be inflated to raise the mat 10 to the surface.

Thus, with the present invention, spat recovery and growth may be conveniently increased by using a single, movable structure to provide a food source, predation shelter, and a hold fast material for harvesting the grown species.

Figure 10:
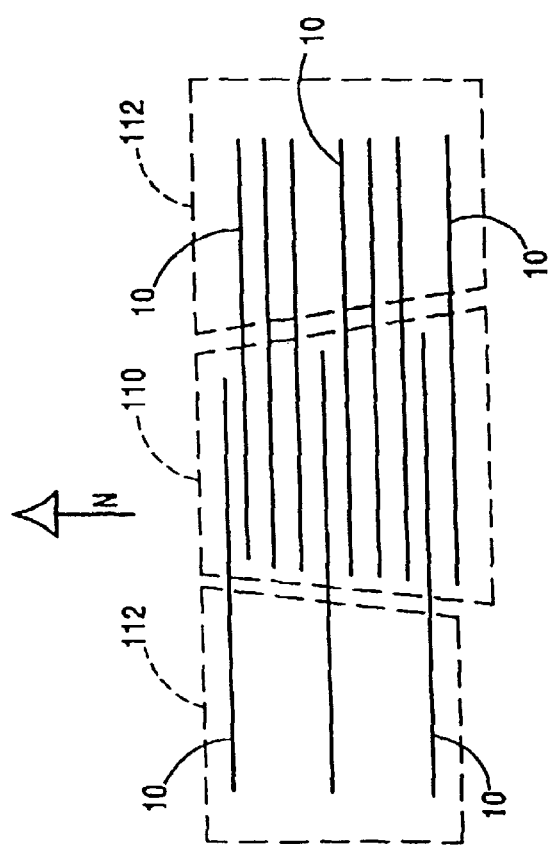
FIG. 10 is a schematic plan view of another aquaculture system constructed in accordance with the present invention.

As shown in FIG. 10, synthetic mats 10 constructed in accordance with the present invention may be arranged parallel to each other and in a staggered manner to accommodate fin fish grow out over a wide size range. In regions 110 where all the mats 10 are adjacent to each other, shade and maximum predation protection are provided for young fish. In the offset or spaced regions 112, more open area (less cover) is provided for larger fish. In addition, the spaced regions 112 provide increased photosynthetic exposure to increase the production of food. The mats 10 may be aligned East-West (perpendicular to North) to maximize sunlight exposure on the mats 10 during the middle of the day. The underwater terrain may be a factor in determining the desired spacings between the mats 10.

Figure 11:
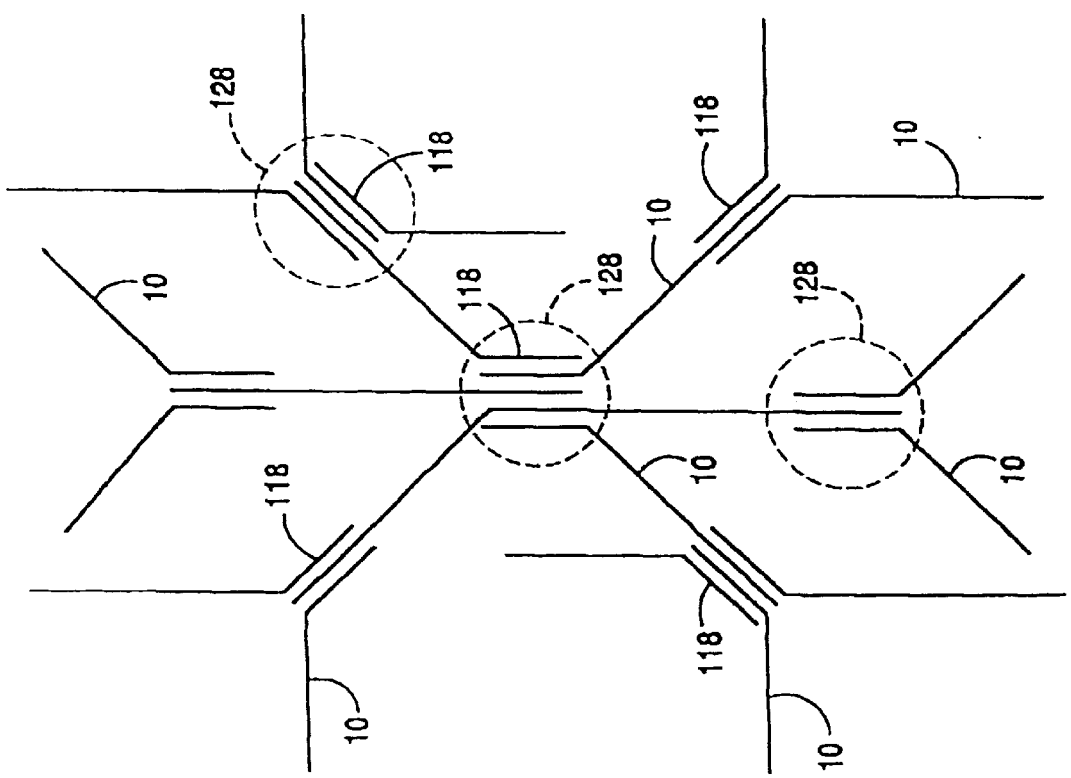
FIG. 11 is a schematic plan view of another aquaculture system constructed in accordance with the invention.

FIG. 11 shows another plan layout for the flexible mats 10. As illustrated, the ends 118 of the synthetic seagrass mats 10 may be overlapped to form predation protection areas 128. In the areas that are not overlapped, more sunlight will be available to provide enhanced periphytic growth. The linear amount of overlapping of the mat ends 118 may be determined as a function of the amount of shade and predation control desired, the aquatic species being raised, and other parameters.

In FIGS. 9–11, the mats 10 are represented schematically by lines only for the sake of clarity of illustration. In practice, the wavy action of the ribbons 12 in water would cause the mats 10 to have an uneven and constantly changing profile in plan view. Depending on the amount of motion in the water, the ribbons 12 could wave past each other and slide past each other which would increase mass transfer between the mats 10 and between the ribbons 12 and the water.

EXAMPLE I 120 synthetic seagrass mats 10 spaced five centimeters apart, and with sixty ribbons 12 per row, were deployed in a series of freshwater ponds having an average depth of one hundred thirty centimeters. There were 30 seagrass mats per hectare. Zooplankton production in the ponds, as compared with control ponds without the synthetic mats, was 7 to 20 times greater. Walleye raised in the seagrass ponds were 18% larger than those raised in the control ponds after the first 52 days of growth. Survival was statistically no different during the first 52 days, between the control ponds and ponds with 30 mats per hectare. However, in the 0 to 92 days time period, the fish not only grew 31.8% larger by weight, but survival in the ponds with seagrass mats was 80% vs. 64% in the control ponds. The combination of these two factors (weight and survival) meant that overall biomass production on the ponds with 30 mats per hectare was 84% greater than that found on the control ponds. Simultaneous with this increase in production, a 78% decrease in fertilizer utilization was achieved, resulting in 12% lower production costs.

EXAMPLE II

Synthetic seagrass beds with the composite ribbon structure shown in FIG. 5 were deployed in fresh water ponds. Each bed had 400 ribbons per mat (or row of ribbons). The spacing between mats was about 7.5 centimeters. The ribbons were about 2.5 centimeters wide and one hundred centimeters long. Smallmouth bass reared in the synthetic structure showed 2.3 times the survival of fish in control ponds without the structure, and the fish were 43.5% larger in the ponds with the synthetic seagrass beds. The zooplankton production in the ponds with the synthetic structure was 12 times that of the control ponds. The effective fish population that could be supported in a pond with the synthetic structure could be increased 250%.

EXAMPLE III

A synthetic seagrass bed with the composite ribbon structure shown in FIG. 6 was deployed in rows of ribbons about 2.5 centimeters wide and 45 centimeters long. Each row contained 24 ribbons. There were 20 rows of ribbons per bed. The spacing between the rows was about 5.0 centimeters. The second layers of each ribbon consisted of porous granular coatings of silica having an average particle size of 40 microns, a surface area of 360 square meters per gram, and an average pore size of 80 angstroms. The bed was submerged in 45 centimeters of water.

Simulated sewage effluent was pumped through the submerged bed at an average linear velocity of 30 millimeters per minute. The water was doped with nitrate (one hundred milligrams of nitrate per liter) and phosphate (five milligrams of phosphate per liter). After allowing twelve days for a bacterial community to become established, it was found that 92% of the nitrates and 76% of the phosphates were stripped from the solution on a continuous basis. As compared with typical Hydraulic Residence Times (HRT) in conventional sponge biofilters, the synthetic seagrass bed, deployed and used as an artificial wetland, was 90 times faster than conventional filter techniques of equal HRT.

EXAMPLE IV

Bioaccumulation

A synthetic seagrass bed with the composite ribbon structure shown in FIG. 6 was deployed in rows of ribbons about 2.5 cm wide and 25 cm long. Each row contained 24 ribbons and there were 48 rows of ribbons per bed. The spacing between rows was about 5 cm. The first layer of each ribbon consisted of a buoyant polyethylene foam having a specific gravity of about 0.12. The second layer of each ribbon consisted of a porous granular coating of silica particles having an average size of 60 microns, a surface area of 280 square meters per gram and an average pore size of 120 microns. The bed was submerged in 25 centimeters of water and simulated plating bath solution was pumped through the submerged bed at an average linear velocity of 50 millimeters per minute. The bed was left in the solution containing a conventional nutrient broth (Difco B3+iron), 100 grams of soil from an area of acid mine drainage and air, diffusion injected at a flow rate sufficient to maintain a dissolved oxygen level greater than 10 milligrams per liter. After ten days, the bath was drained and a solution of simulated plating bath effluent (pH 3.0 ) having 100 parts per million chromium 6+ valency and 100 parts per million zinc 2+ valency was pumped through the bed at a linear velocity of 25 millimeters per minute. After passage of 185 liters (1 bed volume) through the bed, the effluent was measured and the residual levels of chromium and zinc were found to be 1.1 parts per million and 2.3 parts per million, respectively.

To determine the capacity load of the system, simulated plating bath solution was pumped through the system in 50 liter batches until the effluent concentrations of heavy metals reached 5% of the input. Chromium and zinc loading reached 17,850 and 13,670 liters, respectively. On a dry weight recovery basis, the biological growth on the surface of the ribbons was found to contain between 7.5% and 11% heavy metals, by weight, complexed in such a way as to preclude their future biological availability. This demonstrated an 1100 fold concentration capability.

The immobilized metals associated with the bioaccumulation process can be stripped from the flexible ribbons by acid exchange. Alternatively, the fabric mats can be burned to recover the toxic metal species. As compared with ion exchange technology, the present invention may have at least 12 times the load capacity, 10 times the processing speed, and it has the ability to alter the chemical valency state of the metal to reduce its biological toxicity.

After acid stripping at pH 1.8 using phosphoric acid, the synthetic seagrass material was re-suspended in the starter broth for another 12 days and the experiment was rerun. After the equilibration period and the passage of the first bed volume of the synthetic plating bath mixture at a flow rate of 10 millimeters per minute, the concentrations in the effluent were found to be 0.08 parts per million for chromium 6+ and 0.13 parts per million for zinc.

Thus, it was observed that the continued reuse and reconditioning of the bioaccumulation system increased its relative efficiency and capacity. It was determined that the optimum mass transfer for bioaccumulation occurred at a linear velocity of 15 millimeters per minute. Maximum load capacities were related to the mass of biological growth in the microporous structure of the ribbons. The greatest concentration ratio achieved in these tests was 1,870 to 1 with chromium. The highest load capacity achieved allowed the extraction of 2.15 grams of chromium from the 6+ valency state onto a single synthetic seagrass mat. The biomass grown on the total surface area of the mat during the course of five runs was 21.47 grams dry weight with a chromium load of 2.278 grams or 10.61%.

EXAMPLE V

Seagrass structures like those illustrated in FIG. 13 were allowed to mature in fish raceways for two months to establish suitable biofilms on the respective surfaces. The structures were then deployed in a 3 cubic meter tank at a ratio of 10 square meters per cubic meter of water. The tank was doped with ammonia and sodium nitrate to concentrations of 5 milligrams per liter and 200 milligrams per liter, respectively. The structures removed 90% of the ammonia within about 6 hours, and about 90% of the nitrate was removed within about 10.5 hours.

Figure 14:
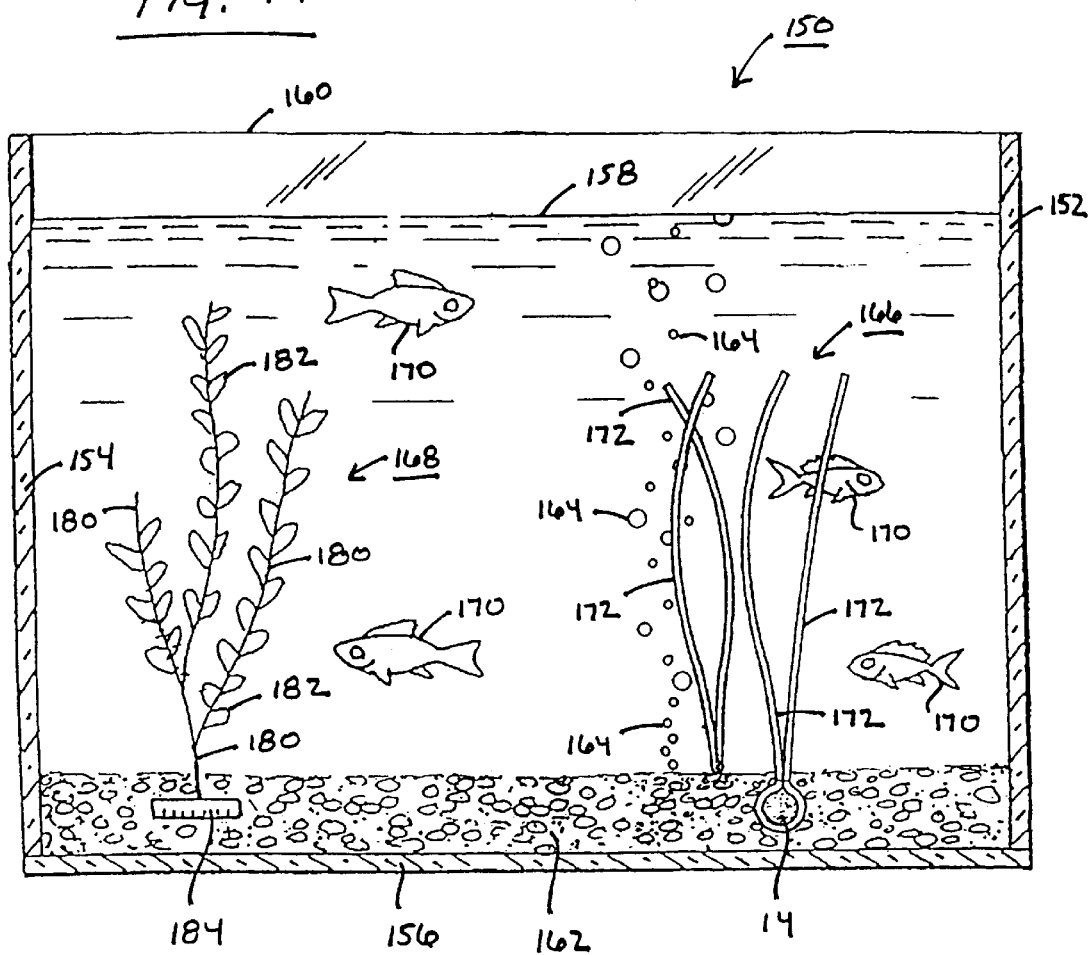
FIG. 14 is a front cross section view of an aquarium constructed in accordance with the invention.

Turning now to FIG. 14, there is shown an aquarium 150 constructed in accordance with yet another embodiment of the present invention. The aquarium 150 has conventional side walls 152, 154 and a bottom 156 defining a generally rectangular space. The space is filled with water 158. The water 158 may be fresh or salt water. The top 160 of the aquarium 150 may be open. Alternatively, a cover (not shown) may be provided. Gravel 162 (or sand) is located on the bottom 156. The gravel 162 may have an ornamental color, if desired. Air bubbles 164 float up from a bubbler (not illustrated). Artificial plants 166, 168 are anchored to the gravel 162. The artificial plants 166, 168 include artificial seagrass 166 and artificial leafy plants 168. Fish 170 swim in the water 158 amongst the artificial plants 166, 168. Shellfish (not illustrated) may also live in the water 158.

The aquarium 150 may be sized for pets and home use. Thus, the side walls 152, 154 may be about twenty to sixty centimeters high, for example. The fish 170 may be goldfish or small tropical fish. Alternatively, the aquarium 150 may be sized for a zoo or the like. On such a large scale, the side walls 152, 154 may be several meters high, and the fish 170 may include manta rays, sharks, and the like.

In another aspect of the invention, the aquarium 150 may be adapted for experimental or research purposes, for example to study the biological and chemical processes in aquatic systems.

The artificial seagrass 166 may be formed of ribbons 172. The ribbons 172 may be in the form of individual mats or pairs of mats, like the mats shown in FIG. 1, but sized to fit in the aquarium 150. In FIGS. 14 and 15, the ribbons that would be behind the respective illustrated ribbons 172, as part of the same sheet or mat, are not shown for the sake of clarity. The mat structure is shown in FIG. 1.

The seagrass ribbons 172 for the aquarium 150 may be formed of any of the ribbons 12, 40, 50, 60, 120, 130 discussed above. The dimensions and mechanical characteristics of the seagrass ribbons 172 may be the same as those of the ribbons shown in FIGS. 1–13. In particular, the seagrass ribbons 172 may each be formed of a buoyant layer 30 adhered (34) or otherwise connected to a high surface area structure 32, 52, 62, 122, 124, 132, 134. The high surface area structure may be used to promote biological growth in the aquarium 150. In a preferred embodiment, the high surface area structure is formed of polyolefin.

An anchor 14 may be used to prevent the ribbons 172 from floating to the surface of the water 158. The anchor 14 may be sufficiently flexible to be bent easily into the desired position on the bottom of the aquarium. For example, the anchor 14 may be bent into a repeating zig-zag or serpentine shape (as shown for example in FIG. 1). Alternatively, the anchor 14 may follow a curved path, and the anchor 14 may encircle other objects in the water.

The anchor 14 may be buried in the gravel 162. Alternatively, it can rest on the surface of the gravel 162 as shown in FIG. 15. The anchor 14 should easily conform to hills and valleys in the gravel 162 at the bottom of the aquarium 150.

Moreover, the anchor 14 should preferably not have a tendency to return to a straight line orientation. To enhance the ability of the anchor 14 to remain in a desired curved or bent position, a malleable wire, such as a coated copper wire 15 (FIG. 15), may be located within the ballast 24 in the anchor 14. The wire 15 may run through the entire length or a portion of the anchor 14. The wire 15 may be coated to preclude interaction between the metal and the water. Alternatively, the ballast 24 may be formed of bismuth shot. The shot will provide sufficient weight to maintain the anchor 14 in the desired position in the aquarium, with no tendency to return to an undesired position.

The shapes of the ribbons 172 may be the same as those of the ribbons 12, 40, 50, 60, 120, 130 discussed above. The ribbons 172 may be economically provided in the form of sheets with elongated anchors 14, like the structures shown in FIGS. 1, 14 and 15. These simple, long rectangular shapes may be economical to manufacture. Alternatively, the ribbons 172 may be trimmed and shaped to more closely resemble real aquatic seagrass. Any of these products may be used economically in large aquariums, such as those found in zoos, and also in small aquariums for home use. To provide enhanced aesthetics for the aquarium 150, individual ribbons 172 may be provided separately or in small groups to fit the available space and to more closely resemble real seagrass.

The ribbons 172 may be provided in different lengths to fit in different size aquariums 150. If desired, the ribbons 172 may be provided in lengths longer than would be required by a typical pet fish aquarium. The operator of the aquarium 150 would cut the ends of the ribbons 172 to the desired lengths.

The artificial seagrass 166 may be used to provide food for the fish 170. Thus, the present invention may be used to make it easier to operate the aquarium 150. Little or no supplemental feeding through the top 160 of the aquarium 150 may be required. Food for the fish 170 may be generated naturally and regenerated by the artificial seagrass 166. The food generating and regenerating function may be initiated, if desired, by implanting or incorporating nutrients and/or bacteria into the high surface area structure of the artificial seagrass 166. In one aspect of the invention, the nutrients and/or bacteria are incorporated into the high surface area structure by the manufacturer of the artificial seagrass 166, before the artificial seagrass 166 is packaged for distribution and sale to consumers.

In a preferred embodiment, the artificial seagrass 166 is both buoyant and flexible. The specific gravity of the seagrass should be near to that of water, however. By providing the seagrass with just a small amount of buoyancy, the artificial seagrass 166 sways gently to and fro in the water 158, in the manner of real seagrass, to provide a visually interesting and appealing effect. The seagrass 166 should preferably not be so buoyant as to stand rigidly upright in the water. The water current to move the artificial seagrass 166 may be generated by the bubbles 164, or by a replenishing source of water (not shown). The flexible artificial seagrass 166 may also be moved by the swimming fish 170. The movement of the artificial seagrass 166 in the water 158 contributes to mass transfer of nutrients and other materials between the artificial seagrass 166 and the water 158.

The artificial seagrass 166 may be inexpensive to manufacture. It may be easily produced from laminated sheets of stock materials, for example. The artificial seagrass 166 does not have to be individually molded. The artificial seagrass 166 can be easily rolled or folded into compact packages for distribution and sale. The artificial seagrass 166 may be colored green or another color to obtain the desired ornamental effect.

The artificial seagrass 166 may also be used to remove excess nutrients and/or toxins (such as ammonia, nitrates and phosphates) from the water 158. In this regard, to control or improve the quality of the water 158, the ribbons 172 of the artificial seagrass 166 may perform the same biological and chemical functions as those discussed above in connection with FIGS. 1–13.

The artificial seagrass 166 may also provide predation shelter for the fish 170. The artificial seagrass 166 may also improve the overall aesthetic appearance of the aquarium by providing moving passages and obstacles for the fish 170 to swim through and around.

The artificial leafy plant 168 may be formed of the same materials as those of the ribbons shown in FIGS. 1–13. The artificial leafy plant 168 has artificial stems 180 and artificial leaves 182. An anchor 184 may be provided to secure the artificial leafy plant 168 in the desired location. The artificial stems 180 may be formed of molded or extruded plastic material. The artificial leaves 182 may be formed of the same layers of buoyant and high surface area structure materials discussed above. The high surface area structures on the artificial leafy plant 168 may be used to generate food for the fish 170 and/or to control the quality of the water 158, in the manner discussed above in connection with the artificial seagrass 166.

Further, the artificial plants 166, 168 may form an integral part of an educational program on the biology and/or ecology of aquatic systems. Printed educational materials (not shown) may be provided in the same package with the artificial plants 166, 168, as a kit. The educational materials may explain how the artificial plants 166, 168 interact biologically with the fish 170 and the water 158. Thus, the artificial plants 166, 168 may be used to teach concepts such as the "food chain," and the connections between biology and water quality. The educational kit may be complemented by water sample test kits for determining water quality, Petri dishes for growing bacteria cultures, and microscopes for viewing microorganisms growing on or in the vicinity of the artificial plants 166, 168.

The artificial plants 166, 168 may be formed of durable materials for ease of handling, shipping, packaging, cleaning, and reuse.

The above descriptions and drawings are only illustrative of preferred embodiments which can achieve and provide the objects, features and advantages of the present invention. It is not intended that the invention be limited to the embodiments shown and described in detail herein. Modifications coming within the spirit and scope of the following claims are to be considered part of the claimed invention.

What is claimed is:

1. An artificial plant for an aquarium, said artificial plant comprising:
   a flexible buoyant layer; and
   a high surface area structure promoting biological growth in said aquarium, said high surface area being connected to said flexible buoyant layer and wherein said high surface area structure is formed of a flexible material such that said artificial plant sways to and fro within said aquarium.

2. The artificial plant of claim 1, wherein said flexible buoyant layer includes closed cell foam.

3. The artificial plant of claim 1, wherein said high surface area structure is adhered to at least one side of said flexible buoyant layer.

4. The artificial plant of claim 1, wherein said high surface area structure includes a layer of filamentary material.

5. The artificial plant of claim 1, further comprising an anchor for securing said plant to the bottom of the aquarium.

6. An artificial seagrass structure for an aquarium, said artificial seagrass structure comprising:
   seagrass elements formed of flexible strips, said flexible strips having flexible buoyant layers and high surface area structures connected to said flexible buoyant layers, said seagrass elments being flexible such that said buoyant layers and said high surface area structures sway to and fro within said aquarium; and
   a flexible anchor for securing said flexible seagrass elements to the bottom of the aquarium, said flexible anchor being integral with said flexible strips.

7. The artificial seagrass structure of claim 6, wherein said flexible strips are formed from a single sheet of material, and wherein said anchor is formed from said sheet of material.

8. An artificial seagrass structure for an aquarium, said artificial seagrss structure comprising:
   flexible strips having buoyant layers and high surface area structures connected to said flexible buoyant layers; and
   a flexible anchor for securing said strips to the bottom of the aquarium, said flexible anchor being initegral with said flexible strips; and
   wherein said anchor includes a tube and ballast material in said tube.

9. The artificial seagrass structure of claim 8, wherein said ballast material includes bismuth shot.

10. An artificial seagrass structure for an aquarium, said artificial seagrass structure comprising: to said flexible buoyant layers;
    a flexible anchor for securing said strips to the bottom of the aquarium, said flexible anchor being interal with said flexible strips; and
    a wire for maintaining the shape of said anchor.

* * * * *